(12) United States Patent
Bosa

(10) Patent No.: US 7,014,232 B2
(45) Date of Patent: Mar. 21, 2006

(54) REMOVABLE AUXILIARY HANDLE FOR TOOLS

(76) Inventor: Alain Bosa, 98 Des Chenes, Vallee Jonction, Quebec (CA) G0S 3J0

( * ) Notice: Subject to any disclaimer, the term of this patent is extended or adjusted under 35 U.S.C. 154(b) by 0 days.

(21) Appl. No.: 10/886,602

(22) Filed: Jul. 9, 2004

(65) Prior Publication Data

US 2005/0011051 A1    Jan. 20, 2005

(30) Foreign Application Priority Data

Jul. 10, 2003 (CA) .................................. 2433601

(51) Int. Cl.
*A01B 1/22* (2006.01)

(52) U.S. Cl. .......................................... 294/58; 16/426
(58) Field of Classification Search .................. 294/57, 294/58; 16/422, 426; 15/145
See application file for complete search history.

(56) References Cited

U.S. PATENT DOCUMENTS

| | | | |
|---|---|---|---|
| 237,891 A * | 2/1881 | Musselman | .................. 16/426 |
| 1,083,054 A * | 12/1913 | Brown | ......................... 294/58 |
| 1,687,190 A * | 10/1928 | Wulff | ............................ 294/58 |
| 2,614,879 A * | 10/1952 | Citso | ............................ 294/58 |
| 3,466,078 A * | 9/1969 | Sholund | ...................... 294/57 |
| 4,050,728 A | 9/1977 | Davidson | |
| 4,128,266 A | 12/1978 | Vaslas | |
| 4,197,764 A | 4/1980 | Auernhammer | |
| 4,225,104 A * | 9/1980 | Larson | ..................... 248/125.8 |
| 4,229,033 A | 10/1980 | Vosbikian | |
| 4,615,533 A | 10/1986 | Sewell | |
| 4,657,277 A | 4/1987 | Haldemann et al. | |
| 4,794,667 A * | 1/1989 | Nelson et al. | ................. 16/426 |
| 4,944,541 A | 7/1990 | Waldschmidt | |
| 5,054,830 A | 10/1991 | Nisenbaum | |
| 5,065,475 A | 11/1991 | Watt | |
| 5,133,582 A | 7/1992 | Rocha | |
| 5,265,307 A | 11/1993 | Hull et al. | |
| 5,265,341 A | 11/1993 | Kikuchi | |
| 5,331,720 A | 7/1994 | Beckingham | |
| 5,400,471 A | 3/1995 | Lichfield et al. | |
| D372,649 S | 8/1996 | Tuggle et al. | |
| D374,381 S | 10/1996 | Meisner et al. | |
| 5,606,772 A | 3/1997 | Ilic | |

(Continued)

FOREIGN PATENT DOCUMENTS

CA      2186537      3/1998

(Continued)

*Primary Examiner*—Dean J. Kramer
(74) *Attorney, Agent, or Firm*—Ogilvy Renault, LLP

(57) ABSTRACT

An auxiliary handle for use on an elongated rod-shaped handle of a tool includes an open loop member with a pair of opposed clamping arms connected to each other solely at a first end thereof via a gripping portion. The clamping arms have free distal end portions defining therebetween an opening adapted to receive the elongated rod-shaped handle. The clamping arms are displaceable about the gripping portion between a first position for accommodating rod-shaped handles of different cross-sectional dimensions and a second position wherein the clamping arms are resiliently depressed one towards the other for clamping onto the rod-shaped handle of the tool. The auxiliary handle also includes an actuator adapted to be connected to the clamping arms for controlling their movement between the first and second positions.

18 Claims, 4 Drawing Sheets

| U.S. PATENT DOCUMENTS | | |
|---|---|---|
| 5,669,650 A | 9/1997 | Rutz |
| 5,695,231 A | 12/1997 | Hoffman |
| D394,991 S | 6/1998 | Meisner et al. |
| 5,771,535 A | 6/1998 | Blessing |
| D398,818 S | 9/1998 | Tisbo et al. |
| 5,829,099 A | 11/1998 | Kopelman et al. |
| D414,088 S | 9/1999 | Juratovac et al. |
| D440,131 S | 4/2001 | Aglassinger et al. |
| 6,553,627 B1 | 4/2003 | Horler |

| FOREIGN PATENT DOCUMENTS | | | | |
|---|---|---|---|---|
| CA | 2298042 | 6/2001 | | |
| DE | 29703115 | 5/1997 | | |
| DE | 29721370 | 4/1998 | | |
| GB | 1432938 | 4/1976 | | |
| NO | 71134 | * 8/1947 | | 294/58 |
| WO | WO8911956 | 12/1989 | | |

* cited by examiner

REMOVABLE AUXILIARY HANDLE FOR TOOLS

BACKGROUND OF THE INVENTION (a) Field of the Invention

The present invention generally relates to an auxiliary handle for use on an elongated rod-shaped handle of a tool.

(b) Description of Prior Art

The use of handles is known from the prior art since many decades to grab tools such as garden tools. Among the existing handles designed to manipulate garden tools, the most commonly known handles comprise an elongated rod portion having the general structure of a shaft at the lower end of which the tool head is grafted. A grip is typically provided at the upper end of the elongated rod handle to facilitate manipulation of the tool. This configuration allows a user to grab the tool by placing one hand on the shaft portion near the head of the tool and the other hand on the other end of the elongated rod handle or on the grip affixed thereto.

One of the major drawbacks associated with this conventional tool handle configuration is the low ergonomic posture of the user and back pain and injuries caused therefrom. To alleviate an inappropriate posture of a user relative to the garden tool, prior art discloses various structural configuration of the elongated rod handle of the tool, as claimed by Blessing, K. C. in U.S. Pat. No. 5,771,535 for example. It has also been suggested to solve this ergonomic drawback by providing auxiliary handles, fixed on the shaft handle. For example, U.S. Pat. No. 5,669,650 to Rutz, U.S. Pat. No. 5,695,231 to Hoffman, U.S. Pat. No. 5,400,471 to Lichefield et al., U.S. Pat. No. 5,331,720 to Beckingham, U.S. Pat. No. 5,133,582 to Rocha, U.S. Pat. No. 5,065,475 to Watt, U.S. Pat. No. 5,054,830 to Nisenbaum, and U.S. Pat. No. 4,050,728 to Davidson all disclose auxiliary handles fixed on the rod-shaped handle of a garden tool or the like to provide a user with a better holding position. More recently, U.S. Pat. No. 6,553,627 to Horler reported a handle assembly for a tool for providing an ergonomic handle designed to minimize back strain and injury.

Solution proposed by the prior art may contribute to alleviate the ergonomic problem inherent to the use of garden tool. However, the auxiliary handles proposed by the prior art are for most of them designed to be permanently attached to a shaft-handled tool. Those designed to be removably attached to a garden tool, as provided in U.S. Pat. No. 6,553,627, are unfortunately not designed to be adapted to a wide variety of shaft diameters. Therefore, all solutions proposed in the prior art require that a user be provided with multiple auxiliary handles to be adapted on a range of garden tools, which is less interesting on an economical aspect.

Therefore, it would be highly desirable to provide an auxiliary handle for garden tools, which is removably attachable to the shaft portion of garden tools, adaptable to a variety of shaft dimensions, and easy to produce at low cost.

SUMMARY OF THE INVENTION

One aim of the present invention is to provide a new auxiliary handle for use on an elongated rod-shaped handle of a tool.

According to a general aspect of the present invention, there is provided an auxiliary handle comprising an open loop member having a pair of opposed clamping arms connected to each other solely at a first end thereof via a gripping portion and having free distal end portions defining therebetween an opening adapted to receive the elongated rod-shaped handle. The clamping arms are displaceable about the gripping portion between a first position for accommodating rod-shaped handles of different cross-sectional dimensions and a second position wherein the clamping arms are resiliently depressed one towards the other for clamping onto the rod-shaped handle of the tool. An actuator is provided for controlling the movement of the clamping arms between the first and second positions.

In accordance with another general aspect of the present invention, there is provided an auxiliary handle adapted to be releasably mounted to elongated-rod shaped handles of different dimensions, comprising a grip, a pair of clamping arms extending from opposed ends of said grip, the clamping arms having spaced-apart distal end portions defining a seat therebetween for receiving a rod-shaped handle of a tool, the distal end portions terminating below the seat into outwardly angled fingers, and a threaded fastener extending transversally through the outwardly angled fingers for selectively causing said clamping arms to be moved towards a closed position in order to releasably clamp the auxiliary handle to the rod-like shaped handle.

In accordance with a still further general aspect of the present invention, there is provided an auxiliary handle for use on an elongated rod-shaped handle of a tool, comprising a grip, a pair of clamping arms extending from opposed sides of the grip and having opposed free distal end portions, a threaded fastener extending transversally through the free distal end portions for displacing the clamping arms between an unlocking position and a locking position, and wherein the threaded fastener extends through a hole defined in a first one of the free distal end portion and through a slot defined in a second one of the distal end portions and extending in a longitudinal direction of said clamping arms to permit tilting of the threaded fastener.

BRIEF DESCRIPTION OF THE DRAWINGS

Reference will now be made to the accompanying drawings, showing by way of illustration, a preferred embodiment thereof, and in which.

It will be noted that throughout the appended drawings, like features are identified by like reference numerals.

DESCRIPTION OF THE INVENTION

Figure 1:
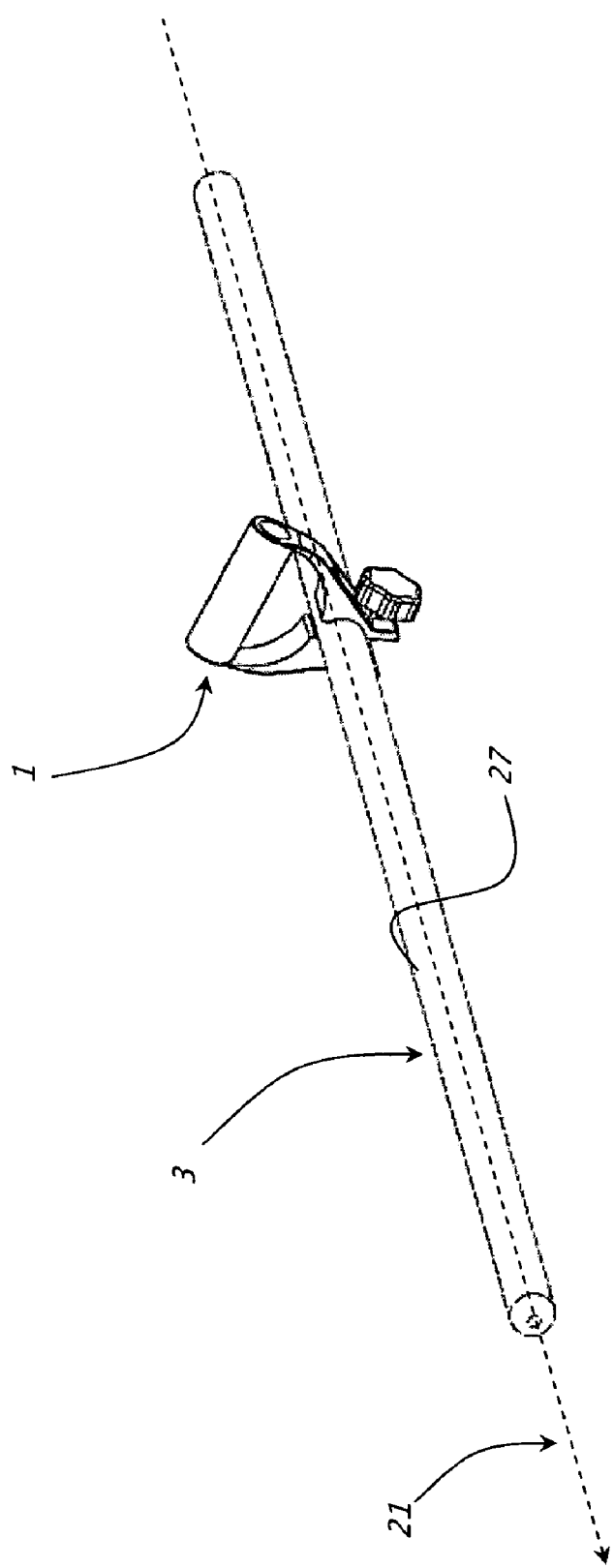
FIG. 1 is a front perspective view of an auxiliary handle according to an embodiment of the present invention, attached to the elongated rod handle of a tool.
Figure 2:
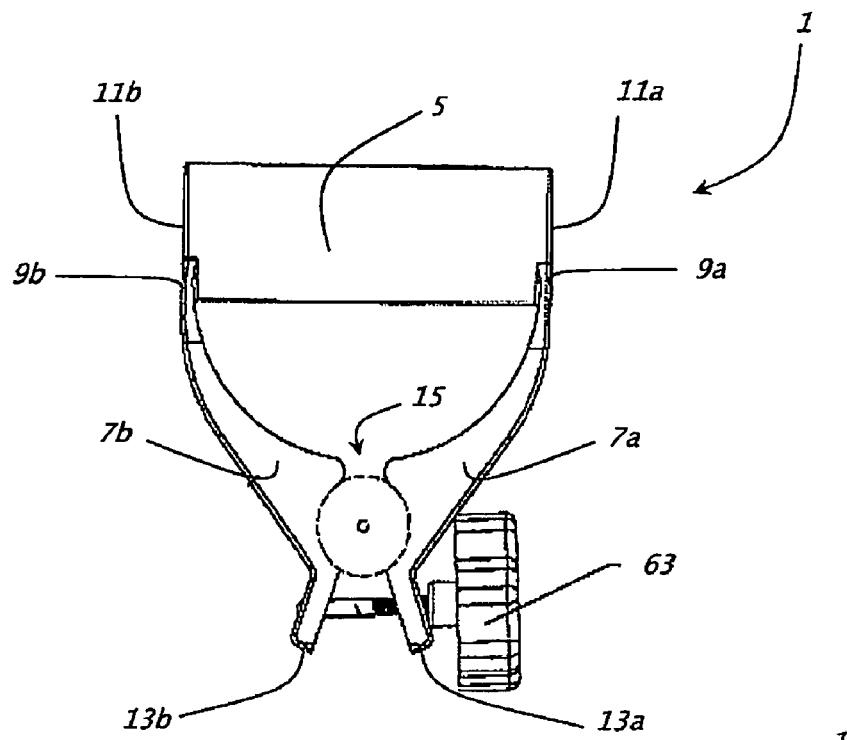
FIGS. 2a and 2b are front views of the auxiliary handle shown in FIG. 1, attached to tool handles of different cross-sectional dimensions.
Figure 2:
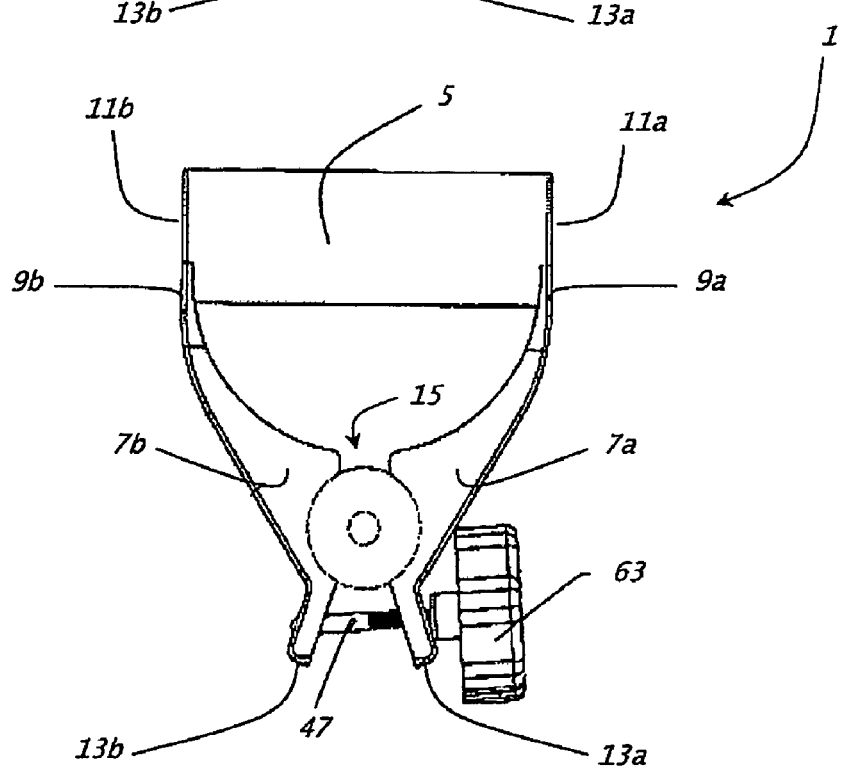

Referring to the drawings, more particularly FIGS. 1 to 4, an auxiliary handle 1 for use on an elongated rod-shaped handle 3 of a garden tool, such as a plow, a rake or a fork, will be described. Auxiliary handle 1 generally has a D-shape and comprises a grip 5 designed to accommodate the hand of a user and two opposed and generally symmetrical clamping members 7a,7b which are solely connected to each other via the grip 5.

Each clamping member 7a, 7b is perpendicularly attached by its upper extremity 9a, 9b to one side extremity 11a, 11b of grip 5. Extremities 13a,13b of clamping members 7a,7b distal from grip 5 converge while remaining physically free one from the other so that grip 5 and both clamping members 7a,7b define an open loop comprising an opening 15. Clamping members 7a,7b and grip 5 are preferably made from a resilient material and more preferably from a plastic material in a manner such that the width of opening 15 can be modified to accommodate elongated handles 3 having rod-shapes of variable diameters, as it will be described in details hereinafter. Grip 5 and clamping means 7a,7b are preferably made form a unique type of plastic material so that grip 5 and clamping members 7a, 7b can be integrally produced as a unitary structure (see FIG. 3).

Figure 3:
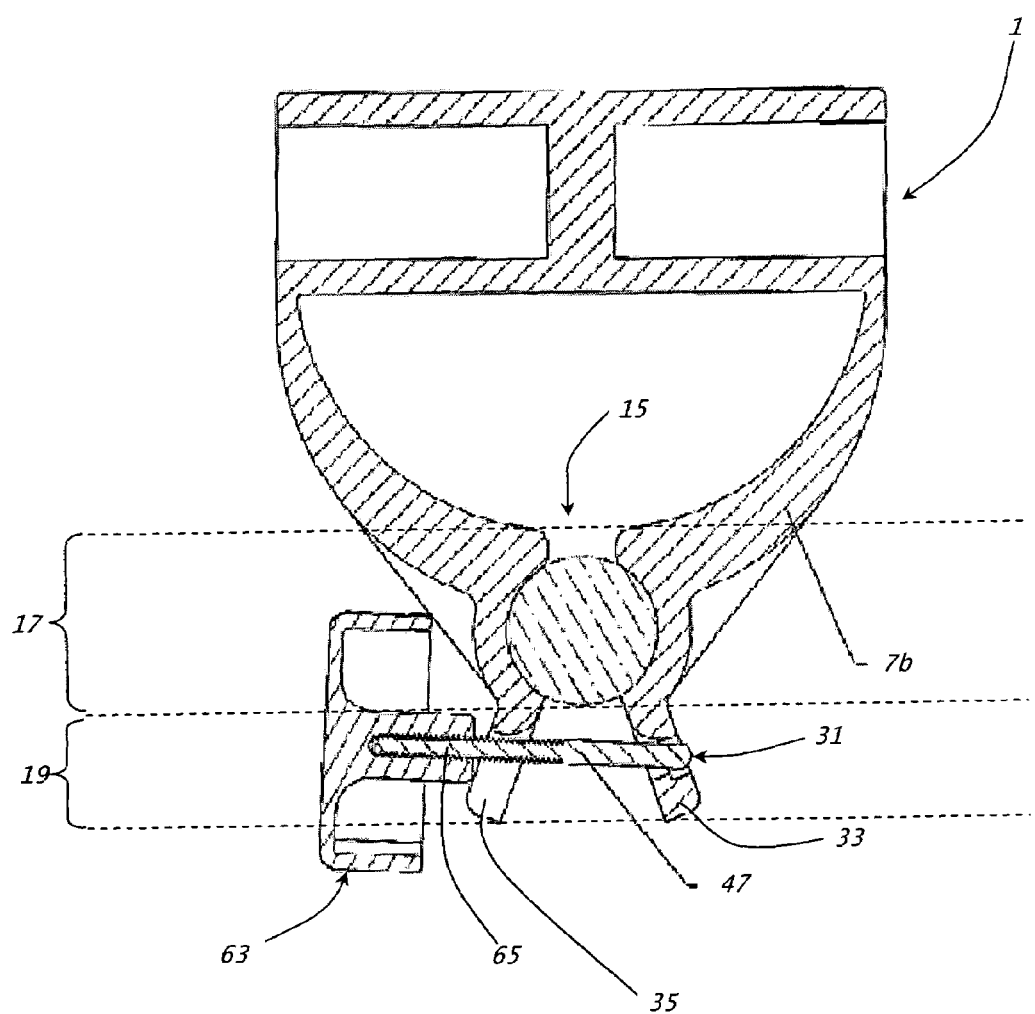
FIG. 3 is a front cross-sectional view of the auxiliary handle shown in FIG. 1.
Figure 4:
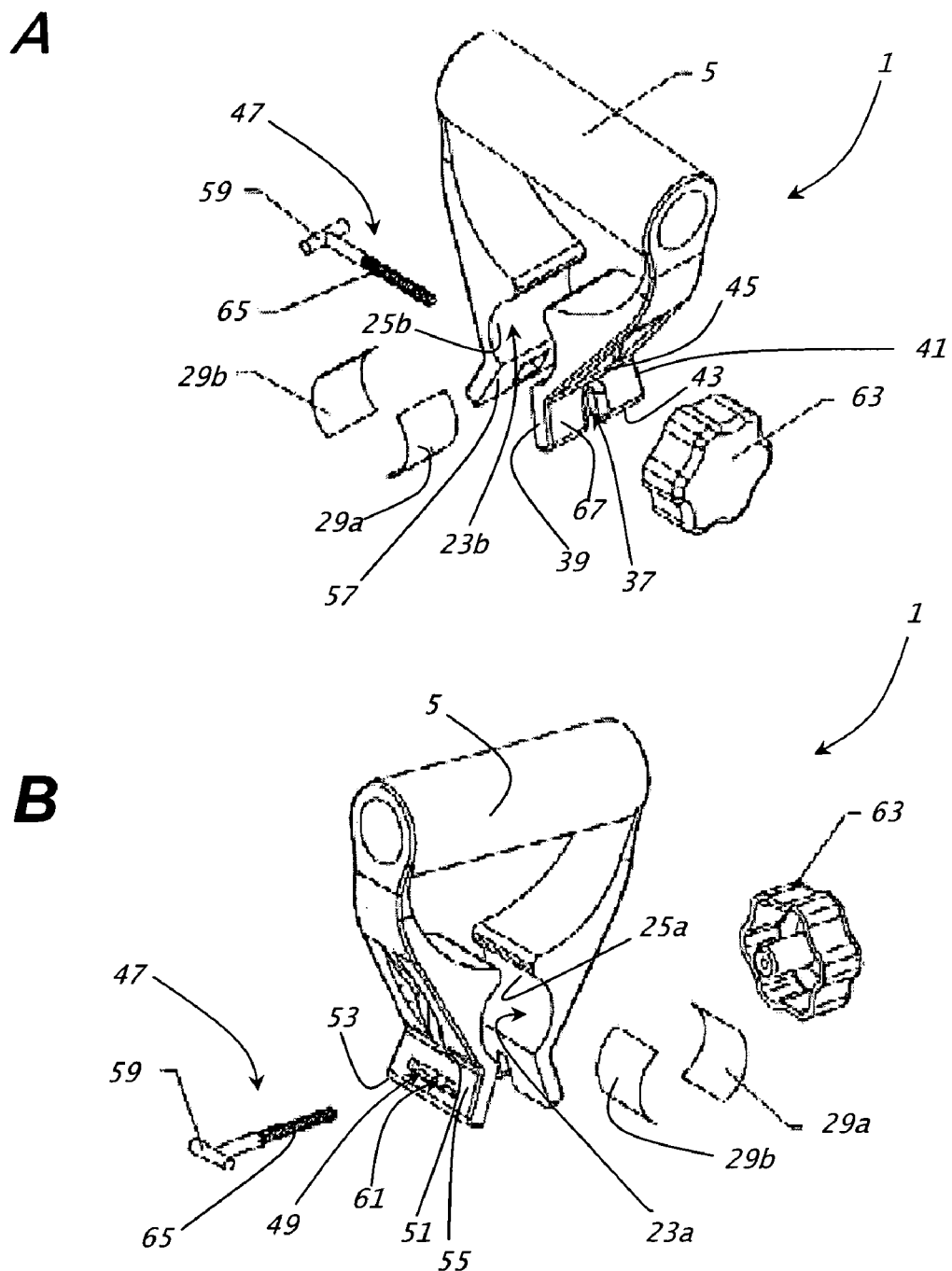
FIGS. 4a and 4b are front and rear exploded perspective views of the auxiliary handle, respectively.

As shown in FIG. 3, opening 15 created by extremities 13a,13b of clamping members 7a,7b defines a handle clamping section 17 and a handle locking section 19 extending therefrom. Both clamping section 17 and locking section 19 will be described in detail hereinafter.

Clamping section 17 connects auxiliary handle 1 to rod-shaped handle 3 of a tool and allows auxiliary handle 1 to be moved along the longitudinal axis 21 of elongated handle 3. Therefore, it provided a tool user with an ergonomic position and contributes to reduce back pain and injuries. Clamping section 17 is defined by a pair of semi-circular cavities 23a, 23b, each cavity being located at one of the free distal end portion of clamping members 7a,7b, facing opening 15. Each cavity 23a and 23b has the shape of a partial cylinder, and more specifically a cylinder cross-sectioned along the longitudinal axis which extends perpendicularly to grip 5 and clamping members 7a,7b. Therefore, facings 25a,25b of cavities 23a,23b are adapted to fit to the cylindrical exterior facing 27 of rod-shaped handle 3. Since clamping members 7a,7b are flexible and thus displaceable about grip 5, cavities 23a,23b are displaceable relative to one another to modify the width of opening 15, thereby allowing accommodating rod-shaped handles 3 of different cross-sectional dimensions. As shown in FIGS. 4a and 4b, frictional padding 29a,29b may further be inserted between facings 25a,25b and exterior facing 27 of elongated handle 3 to modify the circumference of the partially-cylindrical cavities 23a,23b and insure a properly frictional contact between clamping section 17 of auxiliary handle 1 and elongated handle 3. Proper clamping of the clamping members 7a and 7b onto the rod-shaped handle 3 is insured by locking section 19. As will be seen hereinafter, a locking mechanism 31 is provided in the locking section 19 to allow the clamping members 7a and 7b to be brought together towards a closed position.

Locking section 19 comprises two opposed outwardly angled locking members 33 and 35, which constitute the lowest portion of clamping members 7a and 7b, respectively. Locking member 33 has a generally rectangular shape and comprises an open ended slot 37 located midway between front edge 39 and rear edge 41 of locking member 33 and extending from the bottom edge 43 thereof until a location near the top edge 45.

Locking member 35 also has a rectangular shape but defines a longitudinal groove 49 (FIG. 4b), extending on locking member 35 along the longitudinal axis 21 of elongated handle 3. Longitudinal groove 49 is located midway from the top edge 51 and the bottom edge 53 of locking member 35 and extends from the exterior face 55 of locking member 35 until a location situated between exterior face 55 and interior face 57 of locking member 35. A hole 61 is defined at the center of groove 49 through the bottom surface thereof to allow the passage of a T-shaped bolt 47 trough locking member 35. The bolt 47 has a threaded shank 65 and an elongated head 59 extending at right angles from one end of the shank 65. As shown in FIG. 3, the bolt 47 extends transversally through the locking members 33 and 35 and the head 59 thereof is received in the longitudinal groove 49 to prevent rotation of the bolt 47 once properly positioned in hole 61 and slot 37.

The locking mechanism further comprises a knob handle 63 adapted to be threadably engaged to the bolt 47 as shown in FIGS. 2a, 2b and 3. Locking bolt 47 passes through hole 61 of locking member 35 and through slot 37 of locking member 33, where bolt 47 is substantially perpendicular to both locking members 33 and 35. Longitudinal head 59 of bolt 47 is inserted into groove 49 of locking member 35 while the threaded shank 65 of bolt 47 passes through locking member 33. Knob handle 63 is screwed on threaded shank 65 of bolt 47, until it rests against the exterior face 67 of locking member 33. As knob handle 63 is screwed on bolt 47, groove 49 prevent rotation of longitudinal head 59 inserted thereto, and forces locking members 33 and 35 to be depressed one toward another and to releasably clamp the handle 1 onto the elongated rod-shaped handle 3 of the tool.

Locking members 33 and 35 are angularly positioned relative to clamping portion 17 of clamping members 7a, 7b, so that the space between the top edges 45 and 51 of locking member 33 and 35 is narrower than space between bottom edges 43 and 53. This particular configuration of locking members 33 and 35 ensure that threaded shank 65 of bolt 47 and knob handle 63 do not slide along slot 37 while screwing knob handle 63 onto bolt 47 and remain well positioned relative to locking member 33.

Slot 37 advantageously allows disengaging the bolt 47 from the locking member 33 without having to completely unscrew the knob handle 63. In this way, the user has simply to sufficiently unscrew the knob handle 63 to pivot the bolt 47 out of engagement with the locking member 33 and then remove the handle assembly 1 from the rod-shaped handle 3.

In use, auxiliary handle 1 is attached to elongated handle 3 by unscrewing knob handle so as to allow bolt 47 to pivot out of slot 37 or to completely remove bolt 47 from locking member 35. Elongated handle 3 is inserted into clamping portion 17 of auxiliary handle 1 by placing it between locking member 33 and 35 and forcing elongated handle 3 into cavities 23a and 23b of clamping section 17. Alternatively, the auxiliary handle could be slid over the rod-like handle. Clamping arms 7a,7b being resilient and locking members 33 and 35 being angled, forcing elongated handle 3 into clamping portion 17 causes clamping arms 7a,7b to move away to one another, thereby increasing the opening 15 so as to create a passage for elongated handle 3 to cavities 23a,23b of auxiliary handle 1. Once elongated handle 3 is inserted into clamping portion 17, auxiliary handle 1 is secured on elongated handle 3 by properly engaging bolt 47 in hole 61 and slot 37 of locking members 35 and 33, respectively, and by screwing knob handle 63 on threaded shank 65 of bolt 47. Since the elongated head 59 of bolt 47 is received in the longitudinal groove 49, screwing of knob handle 63 on bolt 47 causes distal extremities 13a,13b of clamping arms 7a,7b to become closer one to another, thereby ensuring proper contact between the exterior cylindrical face 27 of elongated handle 3 and faces 25a,25b of cavities 23a,23b of auxiliary handle 1.

The remove auxiliary handle 1 from elongated handle 3, knob handle 63 is unscrewed from bolt 47 so as to pivot bolt 47 away from slot 37 or to completely remove bolt 47 from locking member 35. This causes a release of the pressure exerted on connecting members 7a,7b and allows handle 1 to be freely pulled away from elongated handle 3.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

What is claimed is:

1. An auxiliary handle for use on an elongated rod-shaped handle of a tool, comprising an open loop member comprising a pair of opposed clamping arms connected to each other solely at a first end thereof via a gripping portion and having free distal end portions defining therebetween an opening adapted to receive said elongated rod-shaped handle, the free distal end portions having locking portions, a first one of the locking portions including a hole therein and a second one of the locking portions including a slot extending from the bottom edge thereof, said clamping arms being displaceable about said gripping portion between a first position for accommodating rod-shaped handles of different cross-sectional dimensions and a second position wherein said clamping arms are resiliently depressed one towards the other for clamping onto said rod-shaped handle of said tool, and an actuator extending transversally through the hole and the slot of the locking portions for controlling the movement thereof between said first and second positions.

2. Auxiliary handle according to claim 1, wherein said gripping portion and said opposed clamping arms are integral.

3. Auxiliary handle according to claim 1, wherein said actuator comprises a threaded fastener extending transversally through said locking portions.

4. Auxiliary handle according to claim 3, wherein said threaded fastener comprises a knob handle and a threaded bolt, wherein said threaded bolt comprises a threaded shank and an elongated head extending at right angles from one end of said threaded shank, said elongated head being received in a complementary elongated slot defined in one of said locking portions.

5. Auxiliary handle according to claim 3, wherein said first one of said locking portions comprises an elongated cavity adapted to receive an elongated head of said threaded fastener while a threaded shank thereof transversally extends through said locking portions, wherein said elongated head prevents rotation of said threaded fastener relative to said locking portions once said threaded fastener is properly positioned in said hole and said slot and said elongated head is properly positioned in said elongated cavity.

6. Auxiliary handle according to claim 1, wherein said locking portions diverge from one another.

7. Auxiliary handle according to claim 1, wherein said actuator comprises a rod.

8. An auxiliary handle adapted to be releasably mounted to elongated-rod shaped handles of different dimensions, comprising a grip, a pair of clamping arms extending from opposed ends of said grip, said clamping arms having spaced-apart distal end portions defining a seat therebetween for receiving a rod-shaped handle of a tool, said distal end portions terminating below said seat into outwardly angled fingers diverging from one another, and a threaded fastener extending transversally through said outwardly angled fingers for selectively causing said clamping arms to be moved towards a closed position in order to releasably clamp the auxiliary handle to the rod-like shaped handle.

9. An auxiliary handle as claimed in claim 8, wherein a first one of said outwardly angled fingers comprise a hole therein and a second one of said outwardly angled fingers comprises a slot extending from the bottom edge thereof to allow said threaded fastener to extend transversally through said outwardly angled fingers.

10. An auxiliary handle as claimed in claim 9, wherein said threaded fastener includes a bolt having a head at a first end and a knob threadably engaged on a second end of the bolt, opposite to the first end, the knob extending outwardly of said second one of said outwardly angled fingers.

11. The auxiliary handle defined in claim 10, wherein the head of the bolt has an elongated shape, and wherein the head is received in a complementary elongated slot defined in the first one of said outwardly angled fingers.

12. An auxiliary handle for use on an elongated rod-shaped handle of a tool, comprising a grip, a pair of clamping arms extending from opposed sides of the grip and having opposed free distal end portions diverging from one another, a threaded fastener extending transversally through said free distal end portions for displacing said clamping arms between an unlocking position and a locking position, and wherein said threaded fastener extends through a hole defined in a first one of said free distal end portions and through a slot defined in a second one of said distal end portions, said slot extending in a longitudinal direction of said clamping arms to permit tilting of said threaded fastener.

13. The auxiliary handle defined in claim 12, wherein the slot has an open bottom end for allowing the threaded fastener to be pivoted out of engagement from said second one of said distal end portions.

14. The auxiliary handle defined in claim 13, wherein said threaded fastener includes a bolt having a head at a first end and a knob threadably engaged on a second end of the bolt, opposite to the first end, the knob extending outwardly of said second one of said distal end portions.

15. The auxiliary handle defined in claim 14, wherein the head of the bolt has an elongated shape, and wherein the head is received in a complementary elongated slot defined in the first one of said distal end portions.

16. An auxiliary handle for use on an elongated rod-shaped handle of a tool, comprising a grip, a pair of clamping arms extending from opposed sides of the grip, said clamping arms converging towards one another from the grip and defining a seat therebetween with a variable diameter for receiving a rod-shaped handle of a tool, said clamping arms terminating below said seat into free end locking portions, a threaded fastener extending transversally through said locking portions for displacing said clamping arms between an unlocking position and a locking position, and wherein said threaded fastener extends through a hole defined in a first one of said free end locking portions and through a slot defined in a second one of said free end locking portions, said slot extending in a longitudinal direction of said clamping arms to permit tilting of said threaded fastener.

17. An auxiliary handle as claimed in claim 16, wherein the free end locking portions diverge from one another.

18. An auxiliary handle as claimed in claim 16, wherein said threaded fastener comprises a knob handle and a threaded bolt, said threaded bolt including a threaded shank and an elongated head extending at right angles from one end of said threaded shank, said elongated head being received in a complementary elongated slot defined in one of said locking portions.

* * * * *